Nov. 8, 1960    F. FAULHABER    2,959,092
PHOTOELECTRIC EXPOSURE METER

Filed June 7, 1957    5 Sheets-Sheet 1

Nov. 8, 1960 F. FAULHABER 2,959,092
PHOTOELECTRIC EXPOSURE METER
Filed June 7, 1957 5 Sheets-Sheet 2

INVENTOR
Fritz Faulhaber
BY Mark Blum
ATTORNEYS

Nov. 8, 1960   F. FAULHABER   2,959,092
PHOTOELECTRIC EXPOSURE METER
Filed June 7, 1957   5 Sheets-Sheet 3

INVENTOR
Fritz Faulhaber
BY Marx. Blum
ATTORNEYS

Nov. 8, 1960      F. FAULHABER      2,959,092

PHOTOELECTRIC EXPOSURE METER

Filed June 7, 1957      5 Sheets-Sheet 4

INVENTOR
Fritz Faulhaber
BY Marc Blum
ATTORNEYS

United States Patent Office 2,959,092
Patented Nov. 8, 1960

2,959,092
PHOTOELECTRIC EXPOSURE METER

Fritz Faulhaber, Schonaich, Wurttemberg, Germany, assignor to Voigtlander A.G., Braunschweig, Germany, a corporation of Germany Filed June 7, 1957, Ser. No. 664,253

Claims priority, application Germany June 9, 1956

19 Claims. (Cl. 88—23)

This invention relates to photoelectric exposure meters and it has particular relation to improved exposure meters of this type for measuring the intensity of light available for photographic picture taking and for measuring color temperatures.

In measuring the light available for picture taking by means of conventional exposure meters, which are used more particularly by amateurs, it is not possible to take into consideration the character of the objective used in the camera and its picture taking angle. None of the exposure meters now on the market provide for proper adjustment of the included angle of the light beam incident on the photocell with respect to the respective focal lengths of interchangeable objectives, or for proper measurement of the light values of individual parts of the object to be photographed, for example in order to determine the extent of contrasts in the image. Another disadvantage of the exposure meters, which are on the market at present, consists in their lack of sensitiveness in measuring low intensities of light. Their sensitiveness is far from sufficient for utilizing, in light measuring, all photographic possibilities of picture taking, which can be realized by the use of highly sensitive films, high performance objectives and other devices available in modern photographic cameras. Thus, for example, only experienced photographers are able to obtain satisfactory pictures with weak artificial illumination, e.g. of theater performances, whereby, in most cases, a series of proof pictures have first to be taken, because reliable measuring device for such low intensities of light has been available. Hitherto it has not been possible to render commercially available, to the amateur photographer, a light-measuring device which permits adequate consideration, in a simple manner, of the varying angles of view of exchangeable objectives, as well as of the high sensitivity of picture taking material.

In a known light measuring device, a small photocell is used and is capable of singling out, from a real image in the focal plane, a particular part of the image for light measuring. This cell can be arranged either movably or fixedly and, in the last mentioned case, the entire picture taking device must be tilted correspondingly. These devices are mechanically rather complicated and require dimensions which mitigate against their use by amateurs.

In accordance with the present invention, the foregoing objectionable features are avoided by providing a light measuring device including a light condensing and focusing arrangement having at least one lens for focusing light incident upon a light-sensitive cell, which is preferably a photoresistance cell, having very small dimensions in comparison with the dimensions of the lens and which is furthermore adjustable substantially linearly of the optical axis of the condensing and focusing arrangement between the vertex of the inner surface of the lens and the focal point of the lens. Depending on the requirements in individual cases, instead of a single lens, an objective comprising several lenses can be used as the device for condensing and focusing the light incident upon the light-sensitive cell. In carrying out the present invention, it has been found that the use of a photoresistance cell, based on chalcogenides, particularly of cadmium, and having a relatively low dark resistance, is of particular advantage. It is contemplated, according to the present invention, to use the photoresistance cell in an electric bridge circuit with a balancing instrument and a battery, and to combine this arrangement with a view finder, in the field of view of which the pointer of the balancing instrument is visible, whereby the field of view of the view finder contains means which permit recognition of at least one dimension of the measuring light beam, then incident upon the cell, relative to the sighted object.

According to a preferred embodiment of the present invention, the device of the invention is particularly suitable as a hand exposure meter, but can be used also, without change in the principles of operation, in other applications, whereby certain simplifications are possible. For example, the additional view finder can be omitted if the exposure meter is fixedly built in in a camera, because in such a case the view finder of the camera can take over the corresponding functions. Furthermore, the device according to the present invention can be utilized with great advantage in the automatic control of a hand camera, for example if the adjusting means for the included angle of the light beam on the cell, or the balancing element of the electric bridge, and the like, are coupled with an adjustable exposure controlling component of the camera or the shutter, respectively. Thereby the adjustments can be carried out by hand or automatically, for example by a reversing motor operated by a battery. The arrangement according to the present invention has the essential advantage that, due to the use of the device for adjustment of the measuring light beam, it permits adjustment of varying image angles in the range of about 5 to 100 degrees and that the photoresistance cell used according to the invention in a bridge circuit safely indicates also light intensities below 1 lux. Thus, the exposure meter of the invention can be satisfactorily used for all photographic requirements which occur in photographic practice at present.

In order to avoid an adverse influence on the accuracy of measurement—particularly at larger angles of light incidence—by grazing incidence of the measuring light on the cell surface, it is further contemplated according to the invention to seal the light-sensitive cell surface by a small ground plano-convex lens. This small lens is preferably made of a synthetic material, for example a synthetic resin which adheres to the cell surface.

The casing of the exposure meter is preferably rendered free of reflection in the interior. This can be done for example by knurling or frosting. In this manner disturbing false light can be kept away from the photocell and the accuracy of measurement increased.

The appended drawings diagrammatically illustrate some embodiments of and best modes for carrying out the invention, to which the invention is not limited. The invention will now be described in detail in connection with the drawings, whereby some additional details will be explained.

Figure 1:
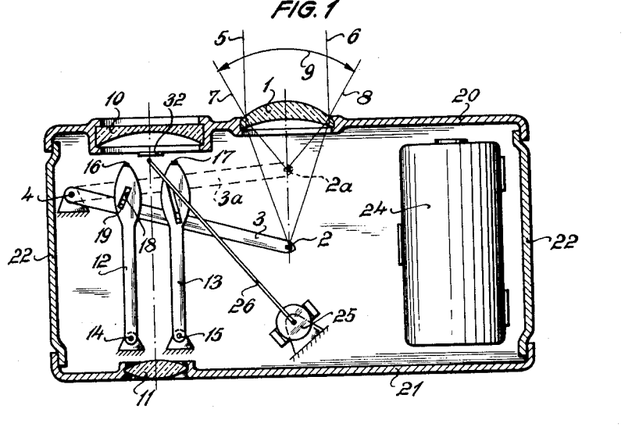
Fig. 1 is a somewhat diagrammatic sectional view of an exposure meter embodying the invention.

Referring now to the drawings in detail, Fig. 1 illustrates application of the present invention to a hand exposure meter. The hand exposure meter contains a converging lens 1 for condensing or focusing the measuring light beam onto the photocell. On the optical axis of the latter, which is shown in dash-dotted line, the small photocell 2 is displaceably arranged. In carrying out the present invention, a very small photoresistance cell, which is made preferably on the basis of chalcogenides of cadmium, is used, and this photocell is connected in an electric bridge circuit supply by a battery. In order to obtain displacement approximately along the optical axis of lens 1, cell 2 is fastened to an end of lever 3 which is tiltable about a stationary point 4 of the camera. In the position of cell 2 shown in the drawing, only the light incident between rays 5 and 6 reaches cell 2, because said cell is located about at the focal point of lens 1. If lever 3 is tilted to the position 3a shown in dotted line, the cell 2 will be in the position 2a, i.e. it will be nearer to the lens 1. In this position 2a, the cell 2 will have incident thereon all light in the angle defined by rays 7 and 8, so that this position of the cell corresponds to an increased picture taking angle 9. Alongside the lens 1 is arranged the lens 10 which is the objective of the finder, while the ocular is shown at 11. Lever 3, to which cell 1 is fastened, controls two additional levers 12 and 13 pivoted at 14 and 15, respectively. By their upward bent ends 16 and 17 the latter bring about a limitation or definition of the image field in such a manner that the portion of the finder image which is visible between lever ends 16 and 17, changes in accordance with the extent of concentrating the light rays, so that the portion of the sighted object viewed between lever ends 16 and 17 serves as a source of measuring light for the photocell.

Figure 2:
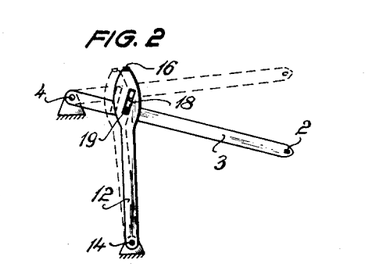
Fig. 2 is a view of a part of Fig. 1, illustrating the correlation between displacement of the photoelectric organ and the means defining the image field in the viewfinder.

Fig. 2 illustrates cooperation of levers 3 and 12 according to Fig. 1. Lever 12 is provided with an inclined elongated slot 18, in which a pin 19, fastened to lever 3, can slide. If lever 3 is tilted to the position shown in dotted line, then lever 12 is likewise brought to the position shown in dotted line. Thus, when cell 2 approaches lens 1, lever 12 will be moved away from the central axis of the finder. A corresponding movement, but in the opposite direction, is simultaneously imparted to lever 13 in Fig. 1. Thus, a larger image angle will be made available in the finder. In this manner, the limitation or definition of the finder image will correspond to the included angle of the light beam incident on photocell 2, as adjusted for each case.

The two lenses 1 and 10 (Fig. 1) are arranged in a casing cap 20 and the ocular lens 11 in a second cap 21. The lateral walls 22 provide for light sealing of the exposure meter and for the assembly of all parts including the caps 20 and 21. The interior of the casing houses, in addition to the parts already mentioned above, the current source 24 and the electric balancing instrument 25 provided with pointer 26. Additional individual parts, such as, for example, adjusting scales, variable bridge resistance for tuning, electric switching means and the like, can be mounted, for example, on suitable portions of member 22, so that a compact, handy device, which can be easily mounted, is obtained.

Figure 3:
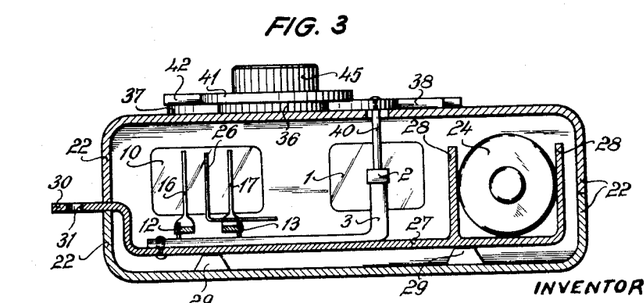
Fig. 3 is a transverse sectional view through a hand exposure meter embodying the invention.
Figure 4:
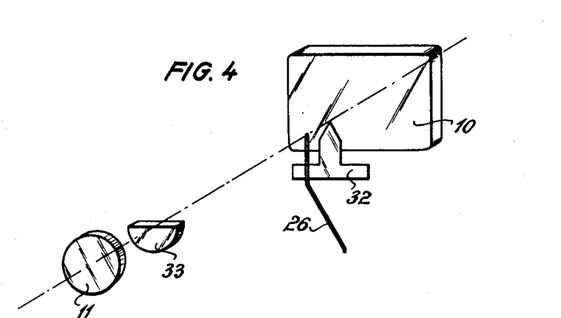
Fig. 4 is a diagrammatic illustration of the optical system for observing the indicator of the meter with relation to the viewfinder.

Fig. 3 is a sectional view of the hand exposure meter in which the arrangement and mounting of individual elements can be seen. Lever 3 and levers 12 and 13 having upward bent ends 16 and 17, are pivotally mounted on a plate 27. Behind the levers, the viewing lens 10 and the light condensing lens 1 can be seen, these lenses having, as shown in Fig. 3, a configuration similar to that of the picture format. Furthermore, in a holding means formed by bent flaps 28 of plate bar 27, the battery 24 is removably mounted. The entire arrangement is enclosed by walls 22 which are shown also in Fig. 1, the lower wall, as viewed in Fig. 3, being provided with supports 29 on which the plate 27 rests. A tongue 30, forming part of plate 27, projects from the casing, and preferably serves for fastening the suspension chain for the device, this plate being provided with a hole 31 for this purpose. In Fig. 3, the electric measuring instrument 25 (see Fig. 1) cannot be seen because the section is taken along the middle of the device. However, pointer 26 is visible, in Fig. 3 in the middle of finder lens 10. This pointer cannot be directly recognized through the ocular of the finder because, in general, this ocular has too long a focal length. In order to render pointer 26 easily visible, the device shown in Fig. 4 in perspective view can be used. Between the ocular lens 11 of the finder and its objective lens 10 pointer 26 balances, according to the invention, in front of a narrow ground glass plate 32. The point of plate 32 extends up to the middle of the objective, i.e. up to the optical axis of the finder, so that the object which is sighted through the finder above this point, corresponds to the middle of the measuring light beam. The pointer 26 and ground glass plate 32 cooperate with each other in the following manner:

Upon looking through ocular 11 and the positive half-lens 33 arranged behind it, through which—due to the focal length selected in suitable manner for this purpose—pointer 26 can be clearly recognized, pointer 26 can be caused to distinctly balance to the point of the ground glass plate, i.e. the zero point of the measuring device, by the handle to be actuated during the measuring step, this handle being described in more detail further below. Thus, ground glass plate 32 serves primarily for rendering centered balancing of pointer 26 possible. Another object of the ground glass plate is to form a diffused bright background for pointer 26 when very dark objects to be photographed are observed. The ground glass plate 32 need not form an independent structural part and can be preferably produced by etching on the inner surface of finder lens 10. The half-lens 33 behind finder ocular 11 permits the eye, when looking through the upper half of lens 11, to recognize or distinguish the finder image and to clearly see the pointer and the ground glass plate through the lower half. If the eye pupil is held at about the middle of lens 11, it is possible to see simultaneously the object as well as the aiming device, i.e. the point of ground glass plate 32 and pointer 26. The two lenses, i.e. ocular lens 11 and half-lens 33, can be replaced, with the same effect, by a corresponding double focal lens.

Figure 5:
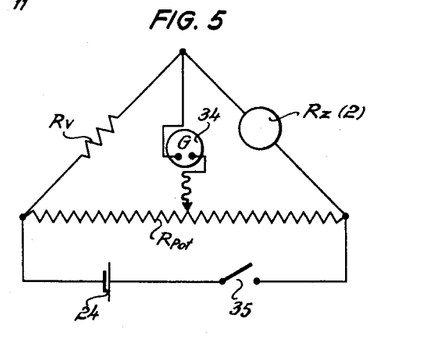
Fig. 5 is a schematic wiring diagram of a bridge circuit used with the exposure meter of the invention.

Fig. 5 illustrates an electric circuit diagram of the present invention. The arrangement shown is a normal bridge circuit consisting of cell resistance $R_z$, the photocell 2, the standard resistance $R_v$ and the bridge potentiometer with the resistance R pot. The balancing instrument 34, such as a galvanometer G, is located in conventional manner. The bridge is supplied by battery 24 and switched on by means of switch 35, which is preferably a pressure switch. The function of the bridge circuit is well known in the art and does not need a detailed description here. The principle of the arrangement is to balance the variable resistance $R_z$ of photocell 2, connected in a branch of the bridge, by displacement of the potentiometer slider in such a manner that the bridge galvanometer 34 is at zero. As the cell $z$, any conventional photoresistance cell can be used, if the dimensions are below certain limits. Thereby, the order of magnitude of the dark resistance is fundamentally irrelevant. However, for reasons connected with construction and measuring technics, it is advisable to use cells having relatively low dark resistance.

Figure 6:
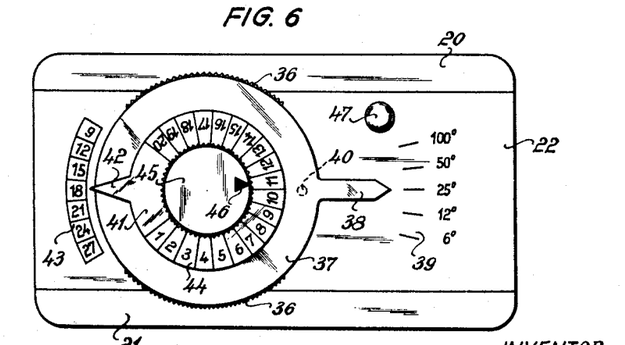
Fig. 6 is a top plan view of a hand exposure meter embodying the invention.

Figure 6 illustrates an exposure meter embodying the present invention as seen the outside in top plan view of the service side. In conformity with Fig. 1, the casing caps are denoted 20 and 21 and the wall 22. In wall 22, a ring 37, which is adjustable by knurled rim portions 36, can be seen, and ring 37 has an extension 38 serving as pointer. A scale 39 is provided to cooperate with the pointer 38, and is graduated in accordance with the included angle of the light beam incident on the photocell. The subdivision lines of scale 39 preferably correspond to the image angles of the exchangeable objectives used. Upon adjustment to the smallest image angle, which may correspond to that of a tele-objective having a focal length of 500 mm., the operator can determine the brightness of details of the object to be photographed, without the necessity of changing his position, and thus measure the extent of contrasts. From disc 37 a pin 40 (see also Fig. 3 in this connection) extends into the interior of the instrument and engages lever 3, to which cell 2 is fastened. Upon displacement of ring 37, through pin 40 the included angle of the incident light beam is adjusted by displacement of cell $z$. Above ring 37, a further rotatable ring 41 is provided, which is adjustable, through its pointer 42, relative to a sensitivity scale 43 which is stationary relative to the casing. This ring 41 carries a graduated scale 44 of light values, which extends from the smallest to the highest values of brightness. Above these two rings, the centrally arranged rotary button 45 is seated, and carries an index 46. In the interior of button 45 the potentiometer (button potentiometer) can be housed. Operation of this arrangement is as follows: First, pointer 38 is adjusted, with respect to scale 39, to select a predetermined included angle for the measuring light beam incident on the photocell. Then, pointer 42 is adjusted, with respect to scale 43, in accordance with the sensitivity of the film or other photographic material used. After this, by pressing down the push button 47, the switch 35 for energizing the measuring bridge is closed and, by means of rotary button 45, the instrument pointer 26, which is visible upon looking through the finder, is caused to balance to the middle field of ground glass plate 32. If this has been done, the measuring is completed and the correct light value for picture taking can be read by means of mark 46 and scale 44. With this light value, the time and diaphragm of the camera can now be adjusted. Instead of the light value scale on ring 44, this ring and the rotary button 45 can be provided with a conventional shutter times scale, and a conventional diaphragm opening value scale, one of these scales being provided on the ring 44, and the other being provided on the rotary button 45, the index 46 being omitted.

The incident light beam condensing or focusing device described in a photographic camera. Those parts of the light measuring system described above, which are normally present in a modern camera and would be duplicated upon building in the measuring system in the camera, can be omitted, so that, in the case of such built-in exposure meters, a simplification in comparison with the structure of a hand exposure meter can be effected.

In building in the exposure meter system in cameras it would be conceivable to use—for example for reasons connected with space saving, arrangement, or operation—an exposure meter structure other than the optimum structure. For example, if the lens dimensions have to be changed for one of the above mentioned reasons, it may happen that, upon adjustment of the included angle of the incident light beam, the values indicated on scales contemplated for an optimum exposure meter are not correct in the respective case. However, in such cases, it is possible to obtain from the movements of the cell, for example, through control cams or the like, a correcting movement for other members of the assembly, such as scales, adjusting components, and the like. Also, if the deviations are of a minor character, it is possible to take such deviations into consideration in the design of the components, for example by proper design and arrangement of the characters of a scale. Such exceptional cases are mentioned here merely for the sake of completeness. They are not of essential importance, because in building in the exposure meter in a camera they by no means represent the rule and occur only as rare exceptions.

It will be understood that displacement of the cell can be carried out not only by means of pivoted levers, but also by other known means, for example by fastening the cell to the nut of a steep spiral screw, allowing the cell to rest and displacing the lens, or by other similar arrangements.

Figure 7:
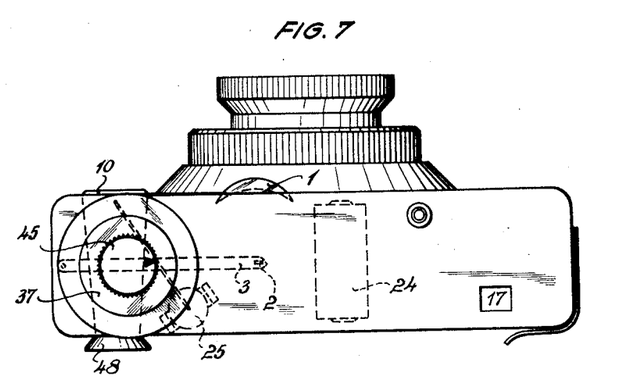
Fig. 7 is a top plan view of a photographic camera having an exposure meter, embodying the present invention, incorporated therein.

An example illustrating the building in of a device according to the present invention in a photographic camera is shown in Fig. 7, which is the top plan view of a simple miniature camera having no exchangeable objectives. This camera is provided, adjacent its left side, with an ocular 48 of the finder. In such a camera, the principal parts of the exposure meter embodying the present invention are built in in the camera cap in the manner indicated in dotted lines. The lens is shown at 1, the cell 2 on lever 3, the balancing instrument at 25 and the battery at 24. Adjustment of the lever 3 takes place by turning knurled disc 37, which is arranged on the cap. Rotary button 45 is located coaxially above disc 37. Ocular 48 serves as the eyepiece of the finder. Without going into further details, it can be easily recognized that the exposure meter built in in a simple camera is practically of the same construction as the hand exposure meter described above in detail.

In building in the exposure meter system of the present invention, for example in a mirror reflex camera, the particular finder means of the exposure meter can be omitted, because the image section projected by the objective to the ground glass plate can be accurately observed. Therefor, in such a camera, merely the light condensing and focusing arrangement, the potentiometer and the current source, the switch-operating button, the rotary balancing button and the scale rings for film sensitivity and the included angle of the light beam incident on the cell, have to be built in, and additionally an instrument, the pointer of which can be balanced to a zero mark at a convenient point in the image appearing on the ground glass plate.

In cameras provided with exchangeable objectives, it is preferred to construct the condensing and focusing arrangement for the incident measuring light beam in such a manner that this arrangement is automatically adjusted as a result of attachment of a particular objective to the camera, to the value of the picture taking angle of the objective. It is advisable not to eliminate the manually operated device for said adjustment, so that, in the case of all objectives, measurements of the extent of contrasts can be still carried out by the use of the narrowest beam of light.

According to a further embodiment of the invention, it is proposed to couple the operating button of the potentiometer with the member for adjustment of the shutter time or with the member for adjustment of the diaphragm opening. Thereby an essential simplification in the operation of the camera can be attained. In such a case, it is not necessary to transfer—after balancing the measuring bridge—the observed light value to the camera, because, upon balancing the pointer to the zero mark, the exposure factor controlling components will have been adjusted in the correct combination for picture taking. Such coupling of the exposure controlling components with the exposure meter can be carried out by conventional means. No changes in the principle of the incident light beam condensing and focusing arrangement and of the bridge circuit according to the present invention, or in its adjusting mechanism and to the optical arrangements of the measuring system, are thereby necessary.

The exposure meter system according to the present invention can be used also for fully automatic control of the camera, whereby adjustment of time and diaphragm, or of both factors, is carried out with the use of a motor. In such a case too, the measuring system combined with the bridge circuit according to the present invention can be utilized without change.

Figure 8:
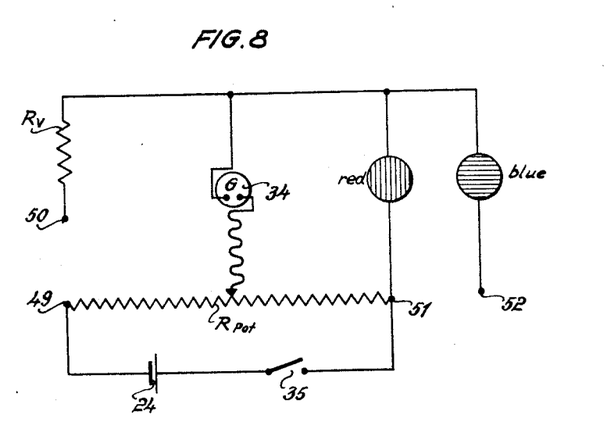
Fig. 8 is a schematic wiring diagram of a bridge circuit useable, in accordance with the principles of the present invention, as an exposure meter or for measuring color temperatures.

The present invention can be applied also to measuring of color temperature. In this connection it is merely necessary to arrange, instead of a photocell, two photocells or a differential cell, in each case with an inserted color filter (e.g. blue and red). Referring to Fig. 8, for measuring the light value, the two cells are connected in parallel in the bridge circuit by connecting contact 49 to contact 50 and contact 51 to contact 52. For measuring color temperature, contact 50 is disconnected from contact 49 and contact 52 is disconnected from contact 51 and connected to contact 49. The bridge will then be balanced to zero when the blue and red portions of the measuring light are equal, while at a different value of these two portions a different balancing position results, which can be then read e.g. on a second scale on the potentiometer adjusting button, as the color temperature, filter number, filter factor and the like.

In Fig. 1, lens 1 is shown as a positive meniscus. Instead of the latter any other kind of converging lens can likewise be used. However, the use of a positive meniscus has the advantage that the device of the invention can be used also as a lux meter, i.e., if the cell 2 is moved into the hollow space of lens 1 and measures in this position a light angle of about 180°.

In order to fully clarify the principle of operation, the invention is further explained in more detail in connection with Figs. 9–13.

Figures 9, 10:
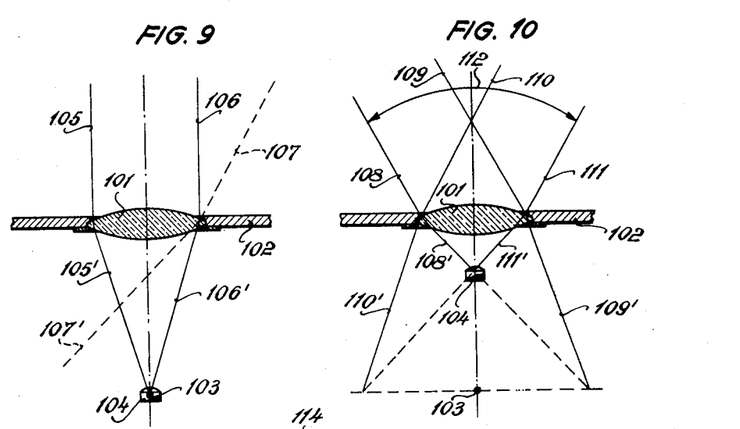
Figs. 9, 10, and 11 are diagrammatic illustrations of the paths of light rays in various positions of the photocell.

Fig. 9 shows a converging lens 101 which is inserted in a light-impermeable casing wall 102. Photocell 104 is located at the focal point 103 of lens 101. Cell 104 is shown on a somewhat enlarged scale, for reasons connected with drafting technics. Its light-sensitive surface is actually only about 2 mm². The incident light rays 105 and 106 reach, in conformity with the law of refraction, the light-sensitive surface of the cell 104 located at the focal point along lines 105' and 106'. Other rays extending outside the area defined by rays 105 and 106, e.g. the ray 107, 107', shown in dotted lines, do not reach the cell and, therefore, do not participate in measuring. In view of the fact that cell 104 is reached only by rays which extend in a direction parallel to rays 105 and 106, or only very slightly deviating from said direction, the position of cell 104 shown, at Fig. 9 in the focal point 103 of lens 101, represents the position for the smallest value of the included angle of the light rays incident on the cell.

If cell 104 is displaced along the optical axis in the direction of lens 101 until it reaches, for example, the position shown in Fig. 10, it can be reached also by rays which are incident at an entirely different angle, i.e. not only those which are about parallel to the optical axis. Such rays are included also in light beams 108, 109 and 110, 111. It can be seen in Fig. 10 that the ray 108, 108' reaches cell 104, while the ray 109, 109' will bypass cell 104 and is incident, for example, on the wall of the device and is absorbed by the latter. The situation is the same in connection with rays 110, 111, after refraction 110' and 111', whereby only ray 111 reaches the cell. It will be understood from the above that, on the one hand, the light angle affecting photocell 104 between rays 108 and 111, has become considerably larger than the angle between rays 105 and 106 in Fig. 9, while, on the other hand, a considerable part of the light incident within this angle 112 does not reach the cell. These two effects, i.e. the increase of angle 112 and, on the other hand, the partial loss of light for measuring, by lateral bypassing of the cell, compensate each other to a large extent, so that, in both positions, according to Fig. 9 and Fig. 10, the cell receives about the equal amount of light. This is a particular advantage of the system according to the invention, because, in this manner, without additional means and without steps to be taken in the measuring mechanism, such as switching of resistance ranges and the like, at a constant intensity of illumination always the same measuring results are obtained irrespective of whether a narrow or wide included angle of the measuring light is used.

Figure 11:
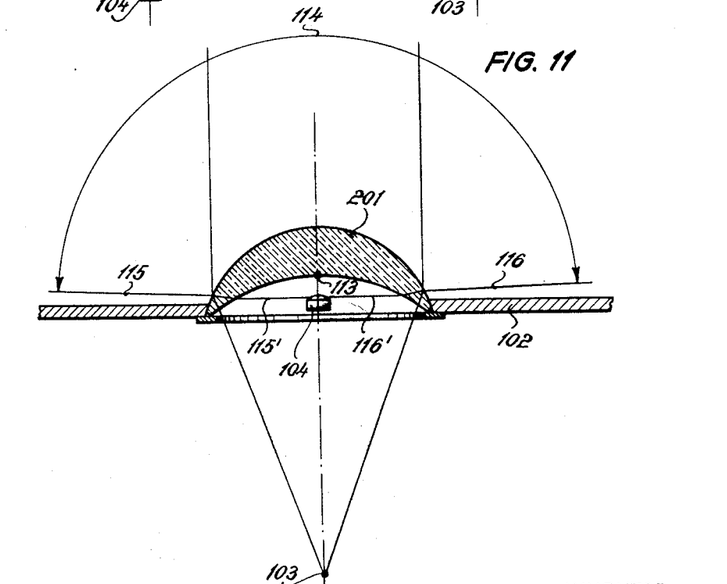

Fig. 11 illustrates a useful embodiment of the light condensing and focusing lens, which is preferred in some cases, said lens being designed (like in Fig. 1) as a positive meniscus denoted 201 in Fig. 11. In this embodiment it is possible to shift the cell 104 to a position near the inner lens surface vertex 113 in such a manner that the image angle 114 between measuring rays 115 and 116 (after refraction 115' and 116') has a value of nearly 180°. Thereby, it is possible to use the light condensing and focusing arrangement of the invention additionally as a lux meter.

Figure 12:
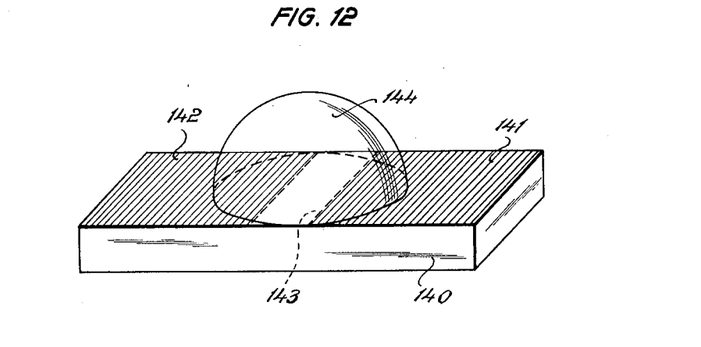
Fig. 12 is an enlarged perspective view of the preferred form of photocell embodying the invention.

In Fig. 12 the photocell is shown on an enlarged scale. In order to avoid incorrect measuring results, due to substantial reflection losses by the cover of the cell in the case where the incident light rays are at a very small angle relative to the cell surface, as when the device is being used as a lux meter, the cell and its carrier 140, including the electrically conductive coatings 141 and 142, has secured thereto, above the light sensitive layer 143, a small plano convex mat lens 144, which serves as an optical and mechanical seal. This lens 144 can be very easily applied during manufacture, for example by a drop of a synthetic resin which adheres to the active cell layer and hardens. If it is contemplated to use a cell for measuring color temperatures, it is advisable to color the drop of synthetic resin with the desired filter color.

Figure 13:
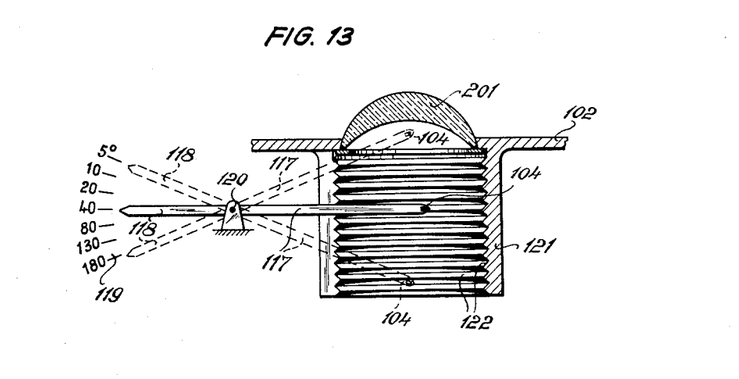
Fig. 13 is a diagrammatical sectional view of adjusting mechanism for displacing the photocell.

Fig. 13 illustrates an example of the displacing mechanism for cell 104 about along the optical axis of lens 201. The cell 104 is located at one end of lever 117, which is pivotal about pivot point 120, and the other end of which is designed as a pointer 118. The pointer 118 permits reading of the image angle, adjusted in each case, on the scale 119.

Due to the use of the light beam adjusting device for measuring instruments in photographic techniques, it is of advantage to select the dimensions of this device in such a manner that parts of the object, which have a design similar to that of the image format, are measured. For this reason it is advisable that the adjusting lens be made instead with a round outline with a design similar to the image format, for example in the dimensions of 10 x 15 mm. or the like, insofar as the known rectangular formats are concerned.

By meeting the requirement of measuring object portions having an outline similar to the image format, by means of a rectangular lens which is similar to said format, according to the present invention, even in the case of a large included angle of the measuring light beam, a sufficiently sharp limitation of the measuring light beam results, although the cell is, of course, in the range of entirely nonsharp image formation of the object.

Furthermore, it should be particularly noted that two oppositely directed influences are utilized in the arrangement of the present invention, which compensate each other at suitable selection of the dimensions in such a manner that limitation of the measuring light beam takes place with about equal sharpness in the case of narrow as well as wide beams. In the case of narrow beams, the image of the object to be measured is sharp in the proximity of the cell. The influence of the image becoming increasingly less sharp nonsharp in the case of increasing the included angle of the incident light beam, is compensated to a great extent by the influence of the border of the shadow of the entrance aperture, because the latter provides increasing sharpness of vision upon such increase in the included angle of the incident beam, i.e. when the cell comes nearer to the wall 102 in which the lens is seated. In other words, the effect of the optical image, which becomes decreasingly sharp upon approach of the cell to the lens, is compensated by the increasing effect of the aperture which limits the respective section and through which the measuring light is incident, because upon shortening the distance between cell and light aperture, the partial shadow becomes smaller so that the aperture effect increases.

The inner surfaces of the casing walls of the bundling device for adjustment of the measuring light beam are preferably of such character that no adverse effect by undesired light reflected from the walls, on the measuring results, occurs. As an example, in Fig. 13 the walls of light shaft 121 are provided with blackened grooves 122 which practically prevent any harmful reflection.

In the above disclosure of the invention, a potentiometer, which is variable by means of a sliding contact, has been described by way of example as a balancing means for the electric measuring bridge. However, it is within the range of the invention to obtain balancing of the bridge by other means. For this purpose, for example, a conventional gray wedge can be used, which is displaceably arranged in front of the photoelectric organ. If the measuring light incident on the photocell is weakened by displacement of the gray wedge in each light measurement to a predetermined fixed value, the potentiometer can be replaced by a more inexpensive fixed resistance. In principle, the bridge circuit can be thereby retained, but the reading of measuring values, the control of couplings and automatic devices and the like, is now derived, instead of from the potentiometer, from the gray wedge and its movement.

It will be understood from the above that the present invention is not limited to the constructions, elements, arrangements, steps, and other details specifically described above and illustrated in the drawings, and can be carried out with various modifications without departing from the scope of the invention, as defined in the appended claims.

As specific examples of the chalcogenides described above, $CdAl_2O_4$, $CdAl_2S_4$, $CdAl_2Se_4$ and $CdGa_2Te_4$ are mentioned. The dimensions of the lens for light beam adjustment are in the range of 100 to 500 mm.². The low dark resistance of the photoresistance cell is in the range of 10,000 to 500,000 Ω.

What is claimed is:

1. A photoelectric exposure meter, capable of adjustment of the angle of the light beam to be measured to the picture-taking angle of a camera objective, comprising a light sensitive cell; a collecting lens for admitting light to be measured to said cell, said cell having relatively very small dimensions in comparison with those of said lens; and means operable to displace the cell substantially along the optical axis of said lens on a path extending from the point of intersection of the inner surface of the lens with said optical axis to the focal point of the lens, in order to adjust the angle of the light beam to be measured by the cell.

2. A photoelectric exposure meter, capable of adjustment of the angle of the light beam to be measured to the picture-taking angle of a camera objective, comprising a light-sensitive cell; a converging lens, having the design of a meniscus, for admitting light to be measured to said cell, said cell having relatively very small dimensions in comparison with those of said lens; a photographic view-finder, including an ocular, an objective, and means for adjusting its field of vision, structurally combined with the exposure meter; means operable to displace the cell substantially along the optical axis of said lens on a path extending from the point of intersection of the inner surface of the lens with said optical axis to the focal point of the lens in order to adjust the angle of the light beam to be measured by the cell; said means for adjusting the field of vision of the viewfinder being coupled with the means displacing the cell.

3. A photoelectric exposure meter, capable of adjustment of the angle of the light beam to be measured to the picture-taking angle of a camera objective, comprising a light-sensitive cell; a converging lens, having the design of a meniscus, for admitting light to be measured to said cell, said cell having relatively small dimensions in comparison with those of said lens; a photographic, view-finder, including means for adjusting its field of vision, structurally combined with the exposure meter; a casing for the exposure meter and the view-finder; means operable to displace the cell substantially along the optical axis of said lens on a path extending from the point of intersection of the inner surface of the lens with said optical axis to the focal point of the lens; said means for displacing the cell including a first lever pivoted at one end on a stationary pivot fastened to said casing and carrying the cell on its free end; a ring arranged outside said casing and operatively connected to said lever to swing the same; the means for adjusting the field of vision of the view-finder including second and third levers which are movable parallel with each other, but substantially at a right angle to the plane of movement of said first lever; said second and third levers each being pivoted at one end on stationary pivots in said casing; said second lever and said third lever having bent free ends and each being formed with a slot extending obliquely relative to the longitudinal axis of the lever; said first lever being provided with two spaced pins engaging said slots of the second and third lever, respectively, so that the free ends of the second and third lever approach each other when the cell is moved away from the lens and recede from each other when the cell is moved in the direction toward the lens; the bent free ends of the second and third lever being visible in the viewfinder as limiting lines of the measuring field.

4. A photoelectric exposure meter as claimed in claim 2, in which the relation between the focal length and the diameter of the lens corresponds to about 1:0.8.

5. A photoelectric exposure meter as claimed in claim 1, in which the light-sensitive cell is a photoresistance cell based on chalcogenides of cadmium and has a low dark resistance, and the light-sensitive surface area of the cell is smaller than 3 mm.².

6. A photoelectric exposure meter as claimed in claim 2, in which the exposure meter has a pointer and said pointer and its balancing to a stationary mark are adapted to be observed in the finder image field.

7. A photoelectric exposure meter as claimed in claim 6, in which said stationary mark consists of a mat, transparent surface portion provided on the interior surface of a lens of the view finder and said mark ends in a point indicating the optical axis of the finder.

8. A photoelectric exposure meter as claimed in claim 6, comprising a half lens arranged near the ocular of the view-finder, in order to bring about sharp vision of the pointer.

9. A photoelectric exposure meter as claimed in claim 6, in which the ocular lens of the view-finder consists of a double focus lens.

10. A photoelectric exposure meter as claimed in claim 6, in which the device for varying the adjustment of measuring light beam and the view-finder have non-reflecting interior surfaces.

11. A photoelectric exposure meter as claimed in claim 5, in which the photoresistance cell is connected in a measuring bridge operated by a battery.

12. A photoelectric exposure meter as claimed in claim 11, in which the photoresistance cell consists of two parts, each of which carries a color filter, and the measuring bridge is provided with connecting contact means for selectively connecting said two parts in the bridge for measurement of light intensity and measurement of color temperature, respectively.

13. A photoelectric exposure meter as claimed in claim 1, in which the light-sensitive surface of the cell has a rectangular shape.

14. A photoelectric exposure meter as claimed in claim 1, in which the surface of the cell is covered by a plano-convex lens having a mat surface.

15. A photoelectric exposure meter as claimed in claim 11, in which the measuring bridge includes a potentiometer.

16. A photoelectric exposure meter as claimed in claim 15, in which the potentiometer is housed by a control knob of the exposure meter.

17. A photoelectric exposure meter as claimed in claim 11, in which balancing of the bridge is effected by a gray wedge arranged in front of the cell.

18. A photoelectric exposure meter as claimed in claim 1, said exposure meter being built-in in a photographic camera.

19. A photoelectric exposure meter as claimed in claim 18, in which the camera and the exposure meter have a common view-finder.

References Cited in the file of this patent

UNITED STATES PATENTS

| | | |
|---|---|---|
| 1,764,368 | Thomas | June 17, 1930 |
| 2,091,762 | Kuppenbender | Aug. 31, 1937 |
| 2,113,450 | Lasky et al. | Apr. 5, 1938 |
| 2,201,606 | Bing | May 21, 1940 |
| 2,227,166 | Tonnies | Dec. 31, 1940 |
| 2,585,451 | Frankel | Feb. 12, 1952 |

FOREIGN PATENTS

| | | |
|---|---|---|
| 837,319 | France | Feb. 8, 1939 |
| 748,255 | Germany | Feb. 9, 1953 |